United States Patent
Park et al.

(10) Patent No.: US 7,377,461 B2
(45) Date of Patent: May 27, 2008

(54) TAPE-END SENSOR AND A MAGNETIC RECORDING AND REPRODUCING APPARATUS HAVING THE SAME

(75) Inventors: Byeng-bae Park, Ansan-si (KR); Jae-hoon Sim, Suwon-si (KR); Hyeong-seok Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 288 days.

(21) Appl. No.: 11/218,573

(22) Filed: Sep. 6, 2005

(65) Prior Publication Data

US 2006/0181801 A1     Aug. 17, 2006

(30) Foreign Application Priority Data

Nov. 9, 2004   (KR) .................... 10-2004-0090646

(51) Int. Cl.
G11B 23/087   (2006.01)
(52) U.S. Cl. ..................................... 242/344
(58) Field of Classification Search ............ 242/340, 242/344, 534, 563; 360/95, 96.1
See application file for complete search history.

(56) References Cited

U.S. PATENT DOCUMENTS 4,616,274 A * 10/1986 Nagaoka ................ 360/71
5,121,275 A   6/1992  Komiyama
6,607,155 B2 * 8/2003 Takaha et al. ............ 242/344
2005/0280926 A1 * 12/2005 Seo et al. .................. 360/85

FOREIGN PATENT DOCUMENTS

| JP | 63-086176 | 4/1988 |
| KR | 1997-10939 | 3/1997 |
| KR | 1997-010940 | 3/1997 |

OTHER PUBLICATIONS

Derwent 2003-719223, Cho et al, Derwent week 200444, Title: Tape sensor holder for magnetic recording/reproducing apparatus.*

* cited by examiner

Primary Examiner—William A Rivera
(74) Attorney, Agent, or Firm—Roylance, Abrams, Berdo & Goodman, L.L.P.

(57) ABSTRACT

A magnetic recording and reproducing apparatus includes a deck to which a head drum is mounted to record and reproduce information with respect to a running tape, and a tape-end sensor to sense starting and finishing ends of the running tape. The tape-end sensor includes a light emitter mounted on the deck to project a light onto the tape being drawn and run from the tape cassette, a light receiver receiving light projected from the light emitter and transmitted through the tape, and a light interrupter blocking light projected to the light receiver that does not pass through the running tape.

22 Claims, 7 Drawing Sheets

TAPE-END SENSOR AND A MAGNETIC RECORDING AND REPRODUCING APPARATUS HAVING THE SAME

CROSS-REFERENCE TO RELATED APPLICATIONS

This application claims the benefit under 35 U.S.C. § 119(a) of Korean Patent Application No. 2004-90646, filed Nov. 9, 2004, the entire contents of which are hereby incorporated by reference.

BACKGROUND OF THE INVENTION

1. Field of the Invention

The present invention relates to a magnetic recording and reproducing apparatus. More particularly, the present invention relates to a tape-end sensor for sensing starting and finishing ends of a tape, and a magnetic recording and reproducing apparatus having the same.

2. Description of the Related Art

Generally, a magnetic recording and reproducing apparatus records information on a recording medium, such as a magnetic tape, and reproduces the recorded information. A video cassette tape recorder (VCR) and a camcorder are examples of the magnetic recording and reproducing apparatus.

The magnetic recording and reproducing apparatus includes a head drum assembly mounted to a deck, a tape guiding means that draws a tape from a tape cassette mounted to the deck and guides running of the tape into the head drum assembly, and a reel table mounted to the deck to support a tape reel of the tape cassette.

The reel table includes a supply reel table for supplying the tape and a take-up reel table for withdrawing the supplied tape. The reel tables are selectively driven by power from a capstan motor mounted to the deck.

For recording and reproducing information with respect to the tape, the tape is drawn from a supply tape reel by the tape guiding means and brought into contact with the head drum assembly. By operating the take-up reel table in this state, the tape is drawn from the supply reel table and wound around the take-up reel table and the head drum assembly, thereby recording and reproducing information with respect to the tape.

When the tape is wound in a certain direction, a control part of the capstan motor is able to determine how much tape is initially wound on the take-up reel. Accordingly, a tape-end sensor for perceiving a starting end and a finishing end of the tape is equipped to detect when the tape is completely drawn and to appropriately control driving of the capstan motor.

The tape-end sensor includes a light emitter mounted on the deck and a pair of light receivers mounted on the deck to receive the light emitted from the light emitter.

The light emitter is disposed between the pair of reel tables to emit light bi-directionally. The light receivers are separated from each other with respect to the deck to receive the light emitted from the light emitter. The starting and finishing ends of the tape are provided to have a particular optical transmittance different from that of a data recording area of the tape. For example, when the tape does not transmit the emitted light, the light receivers do not receive the emitted light. Therefore, the control part determines that the finishing end of the tape is not yet drawn out and therefore continues driving the capstan motor.

Alternatively, when the finishing end of the tape is made of a translucent material, the light receivers receive the light when the finishing end of the tape is drawn out. Accordingly, the control part is able to regulate the capstan motor to stop or decelerate.

In existing magnetic recording and reproducing apparatuses, a height of the tape may vary according to running tension of the tape. When the height of the tape is changed, the light emitted from the light emitter may deviate from an edge of the tape and be received by the light receivers, instead of being screened by the tape. Therefore, an error may result in detecting the tape ends.

Accordingly, a need exists for a magnetic recording and reproducing apparatus having an improved tape-end sensor.

SUMMARY OF THE INVENTION

Accordingly, an aspect of the present invention is to provide a tape-end sensor capable of correctly perceiving a starting end and a finishing end of a tape, and a magnetic recording and reproducing apparatus having the same.

A tape-end sensor for a magnetic recording and reproducing apparatus includes a deck to which a head drum is mounted to record and reproduce information with respect to a running tape, and a tape-end sensor to sense starting and finishing ends of the running tape. The tape-end sensor includes a light emitter mounted on the deck to project light onto the tape being drawn and run from the tape cassette, a light receiver adapted to receive light projected from the light emitter and transmitted through the tape, and a light interrupter for blocking light projected to the light receiver that does not pass through the running tape.

The light receiver includes a pair of prisms respectively connected to opposite sidewalls of the deck and having a height substantially corresponding to the light emitter, and a pair of receiving sensors disposed below the prisms to receive light refracted by the prisms.

The optical interrupter includes a light absorption member attached to cover a predetermined area of the prism.

The optical absorption member includes a black film.

The optical interrupter may further include a scratched surface formed by scratching a predetermined area of the prism to block transmission of the light.

The prism includes a reflecting surface for reflecting light emitted by the light emitter to the light receiving sensor.

The tape-end sensor further includes a circuit board mounted at a lower part of the deck and supporting the light receiving sensor so that the light receiving sensor is directed toward the prism.

The light receiver includes a holder supported by the circuit board and protruding from an upper portion of the deck, and a light emitter supported by the holder to project light onto the prism.

The above aspects of the present invention are achieved by providing a magnetic recording and reproducing apparatus including a head drum mounted to a deck to record and reproduce information with respect to a running tape, and a tape-end sensor to sense starting and finishing ends of the running tape. The tape-end sensor includes a light emitter mounted on the deck to project light onto the tape being drawn and run from the tape cassette, a light receiver adapted to receive light projected from the light emitter and transmitted through the tape, and a light interrupter adapted to block light projected to the light receiver that does not pass through the running tape.

In order to achieve another aspect of the present invention, a magnetic recording and reproducing apparatus is provided that includes a main deck to which a head drum is mounted, a sub-deck mounted to the main deck to slide in a reciprocating motion and to receive a tape cassette, and a tape-end sensor adapted to perceive the tape being drawn from the tape cassette. The tape-end sensor includes a light emitter mounted on the sub-deck to project light, a light receiver adapted to receive the light projected from the light emitter and transmitted through the tape, and a light interrupter adapted to block light projected to the light receiver that does not pass through the running tape.

The light receiver includes a first light receiver adapted to sense light projected in a direction for withdrawing the tape drawn from the cassette tape to detect the starting end of the tape, and a second light receiver adapted to sense light projected in a direction for drawing out the tape from the tape cassette to detect the finishing end of the tape.

The first and the second light receivers respectively includes a prism mounted on a sidewall of the sub-deck to refract incident light, and a light receiving sensor mounted to a main deck to receive light refracted by the prism.

Other objects, advantages and salient features of the invention will become apparent from the following detailed description, which, taken in conjunction with the annexed drawings, discloses preferred embodiments of the invention.

BRIEF DESCRIPTION OF THE DRAWING FIGURES

The above aspect and other features of the present invention will become more apparent by describing in detail exemplary embodiments thereof with reference to the attached drawing figures, in which.

Throughout the drawings, like reference numerals will be understood to refer to like parts, components and structures.

DETAILED DESCRIPTION OF EXEMPLARY EMBODIMENTS

Hereinafter, exemplary embodiments of a magnetic recording and reproducing apparatus of the present invention are described in detail with reference to the accompanying drawing figures.

The matters defined in the description, such as a detailed construction and elements thereof, are provided to assist in a comprehensive understanding of the invention. Thus, it is apparent that the present invention may be carried out without those defined matters. Also, well-known functions or constructions are omitted to provide a concise description of the exemplary embodiments of the present invention.

Figure 1:
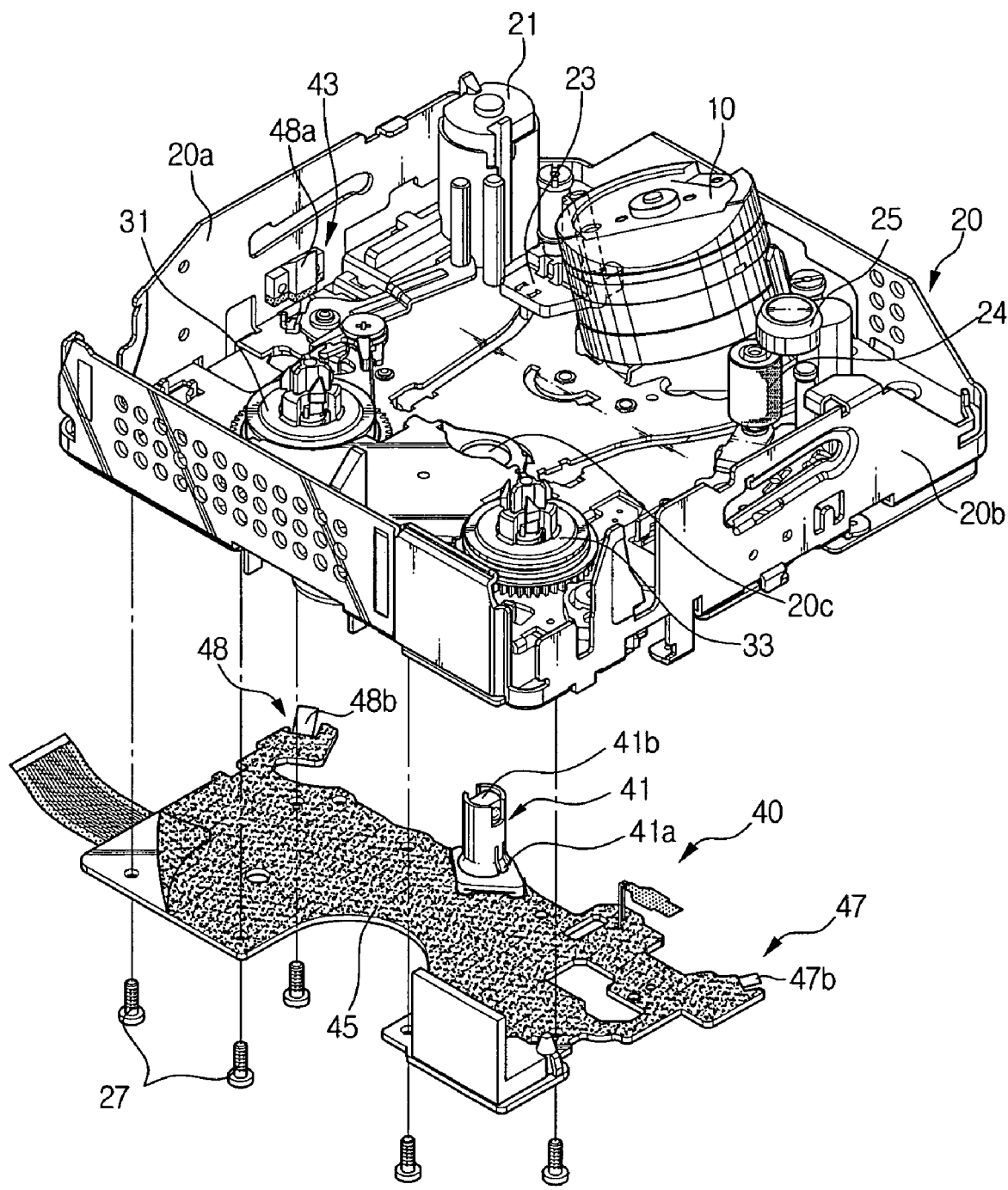
FIG. 1 is an exploded, perspective view of a magnetic recording and reproducing apparatus according to an exemplary embodiment of the present invention.

FIG. 1 is an exploded perspective view showing a magnetic recording and reproducing apparatus according to an exemplary embodiment of the present invention.

Referring to FIG. 1, the magnetic recording and reproducing apparatus includes a deck 20 to which a head drum 10 is mounted, reel tables 31 and 33 for driving a tape cassette on the deck 20, and a tape-end sensor 40 to sense starting and finishing ends of a tape being drawn out from a tape reel of the tape cassette. The reel tables include a supply reel table 31 and a take-up reel table 33.

A plurality of structures are disposed on the deck 20. The structures include a mechanism for loading the tape and recording and reproducing information with the tape. More specifically, the deck 20 includes a loading motor 21 that draws the tape from the tape cassette received in the reel tables 31 and 33 and guides running of the drawn tape along a predetermined path, and a plurality of guide members 23 and 24. The head drum 10 includes a magnetic head that records and reproduces information on the tape that is running along the predetermined path.

The reel tables 31 and 33 receive power from a capstan motor 25 mounted to the deck 20, thereby being selectively rotated. An idle gear (not shown) is provided on the deck 20 to receive power from the capstan motor 25 and to transmit power to one of the reel tables 31 and 33.

The guide members 23 and 24 include a pair of pole base assemblies and a pinch roller assembly. In this exemplary embodiment, a guide slit for guiding the pole base assembly 23 is formed integrally with the deck 20 as a single unit.

A cassette housing (not shown) for mounting the tape cassette is further provided on the deck 20 and is adapted to move vertically.

The tape-end sensor 40 includes a light emitter 41, a light receiver 43, a light interrupter 44 and a circuit board 45.

Figure 2:
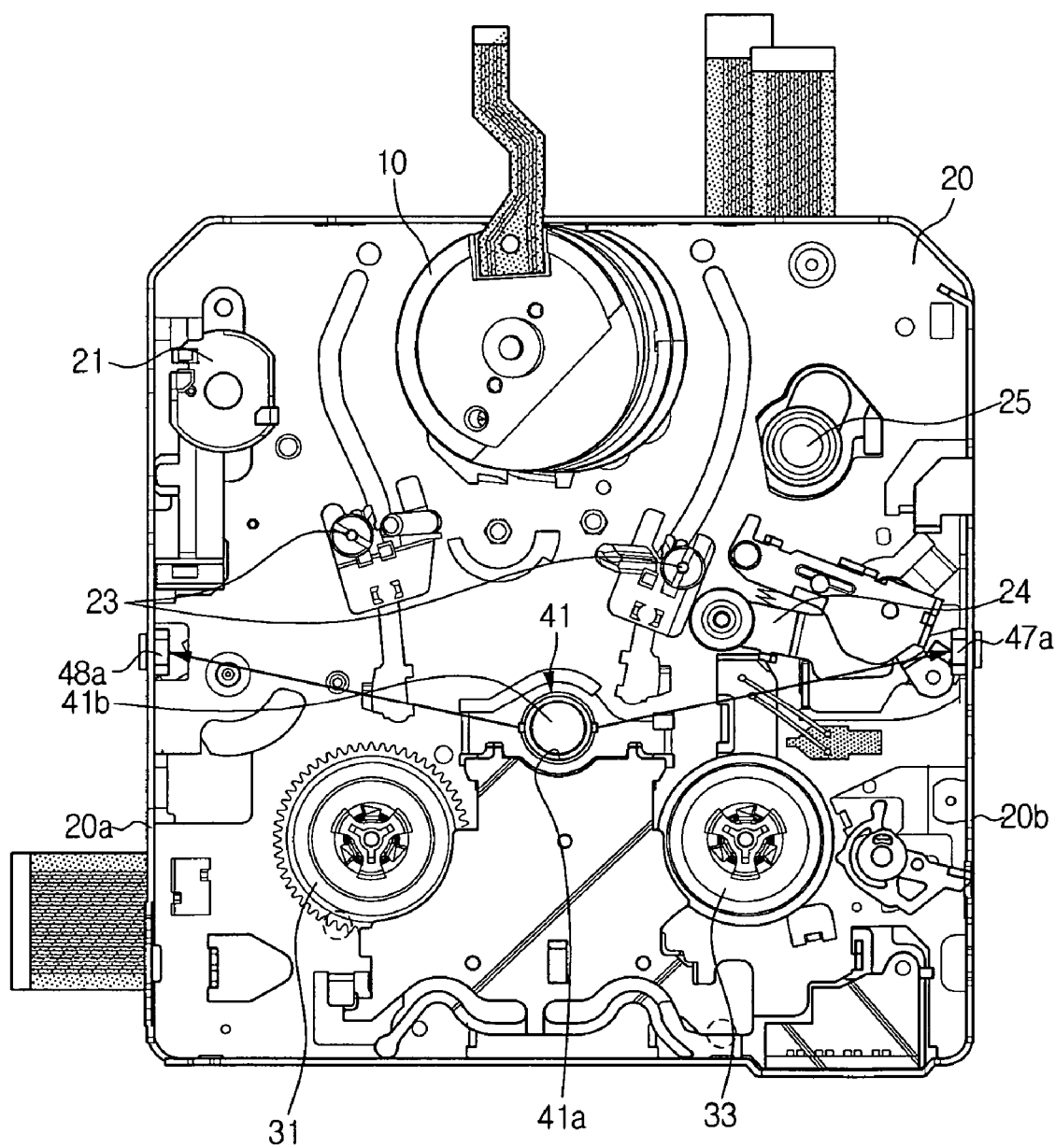
FIG. 2 is a top plan view of the magnetic recording and reproducing apparatus of FIG. 1.

Referring to FIG. 2, the light emitter 41, which protrudes from an upper portion of the deck 20, projects a light toward opposite sidewalls 20a and 20b of the deck 20, respectively. The light emitter 41 includes a holder 41a mounted to the circuit board 45 and a light emitting diode (LED) 41b supported by the holder 41a. The LED 41b is electrically connected to the circuit board 45 to bi-directionally project the light according to an electrical signal input from the circuit board 45. The LED 41b projects the light onto the tape drawn out from the tape cassette.

The circuit board 45 is fastened to a lower portion of the deck 20 by a fastener, such as a screw 27. A through-hole 20c is formed in the deck 20 so that the light emitter 41 supported by the circuit board 45 protrudes from the upper portion of the deck 20.

Figure 3:
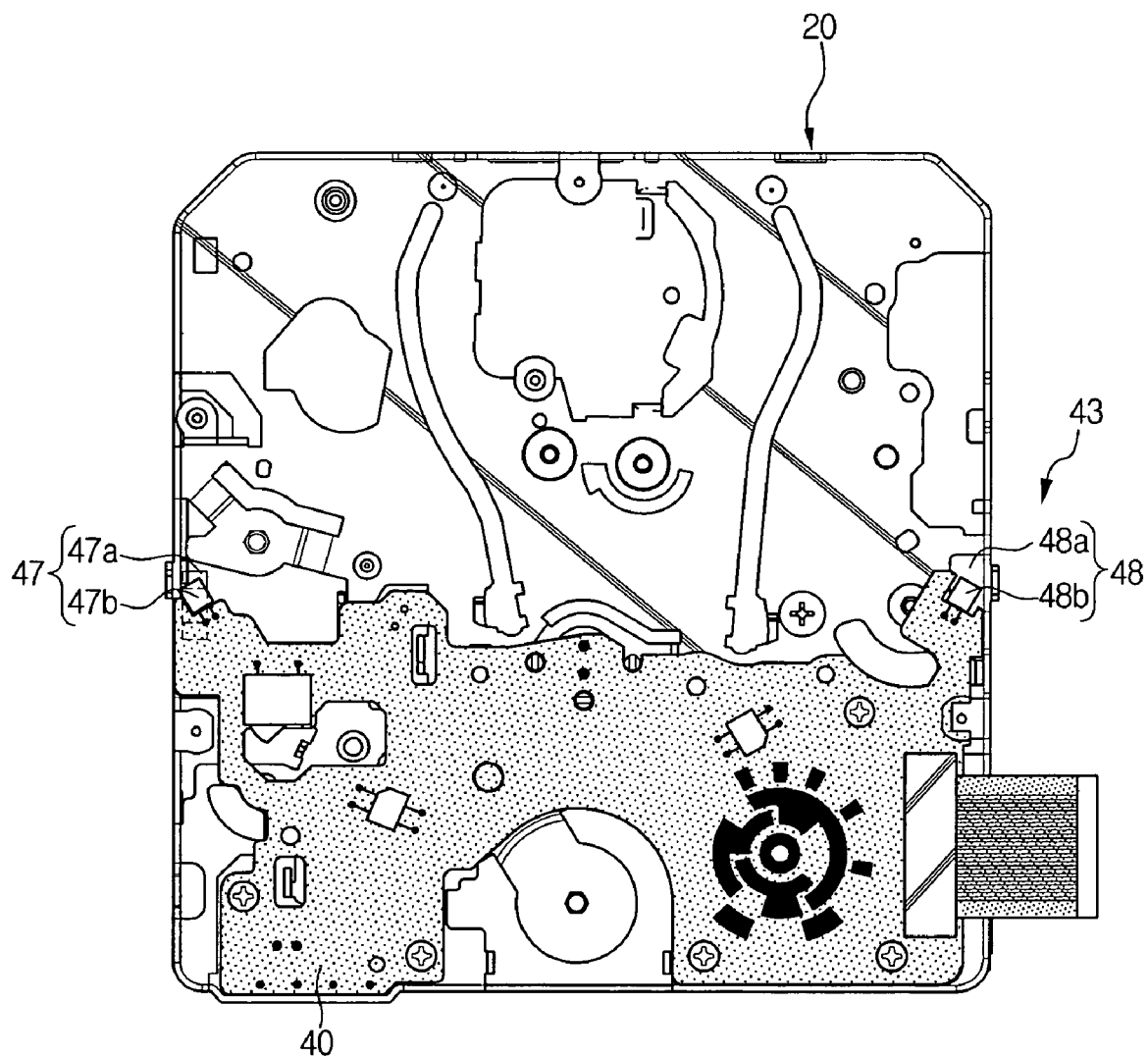
FIG. 3 is a bottom plan view of the magnetic recording and reproducing apparatus of FIG. 1.

The pair of light receivers 43 are symmetrically disposed with respect to the light emitter 41 to receive the light projected from the light emitter 41. More specifically, referring to FIGS. 2 and 3, the light receiver 43 may include a first light receiver 47 detecting a starting end of the tape at the take-up reel table 33 and a second light receiver 48 detecting a finishing end of the tape at the supply reel table 31.

The respective light receivers 47 and 48 respectively include prisms 47a and 48a supported by the sidewalls 20a and 20b of the deck 20, and light receiving sensors 47b and 48b disposed below the prisms 47a and 48a.

Figure 4:
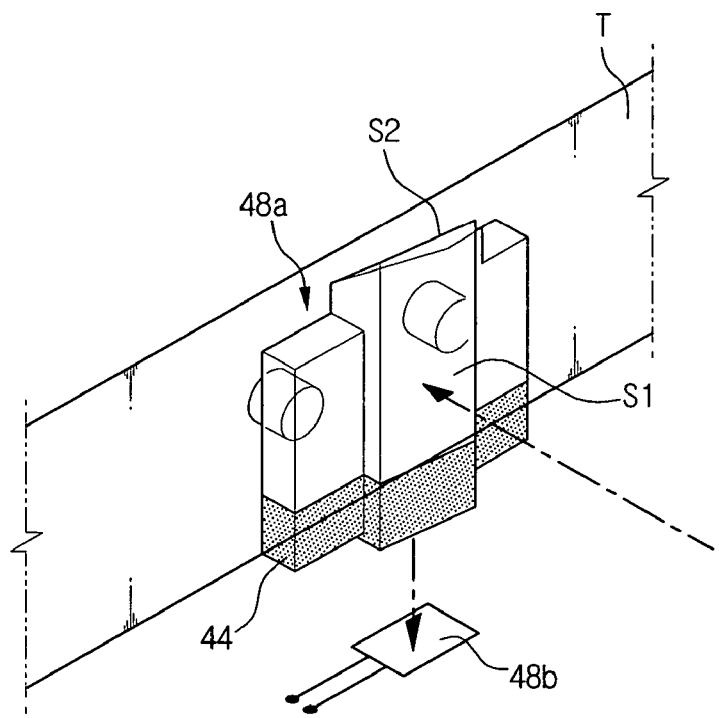
FIGS. 4 and 5 are perspective views of the light receivers of FIG. 1.
Figure 5:
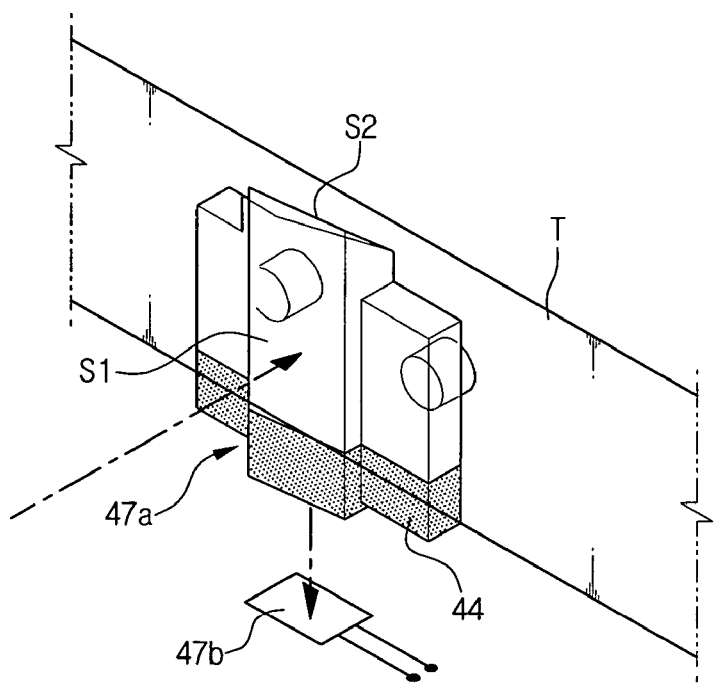

The prisms 47a and 48a both have substantially the same shape and are made of a transparent material to enable refraction and transmission of incident light. Referring to FIGS. 4 and 5, the prisms 47a and 48a respectively have an incident surface S1 disposed to be substantially perpendicular to the incident light and a reflecting surface S2 for refracting downwardly the incident light being dispersed.

The prisms 47a and 48a respectively have the light interrupter 44 that blocks incident light not transmitted through the tape T (FIG. 4). The light interrupter 44 is preferably an optical absorption member, such as a black film, attached to partly cover the incident surface S1 of the prisms 47a and 48a. More preferably, the light interrupter 44 is disposed below the respective prisms 47a and 48a.

Although not shown, additionally, the light interrupter 44 may have a scratched surface formed by processing the incident surface S1 of the prism 47a and 48a to have a predetermined roughness. While manufacturing the prisms 47a and 48a, the light interrupter may be formed by scratching the incident surface S1 to effectively block the incident light.

The light receiving sensors 47b and 48b are mounted on the circuit board 45 below the respective prisms 47a and 48a. The light receiving sensors 47b and 48b receive light being dispersed and refracted by the prisms 47a and 48a, in electrical connection with the circuit board 45, thereby sensing the starting and finishing ends of the tape. The light receiving sensors 47b and 48b may be directly formed on a bottom of the deck 20.

In an magnetic recording and reproducing apparatus having the above construction, according to an exemplary embodiment of the present invention, when the tape T shakes or flaps vertically, projected light that does not pass through the tape T may be blocked by the light interrupter 44. As a result, the light sensors 47b and 48b are prevented from receiving deviated light, thereby preventing malfunctioning of the tape sensing operation. Thus, malfunction during tape perception operation may be prevented, thereby improving reliability of the product.

Figure 6:
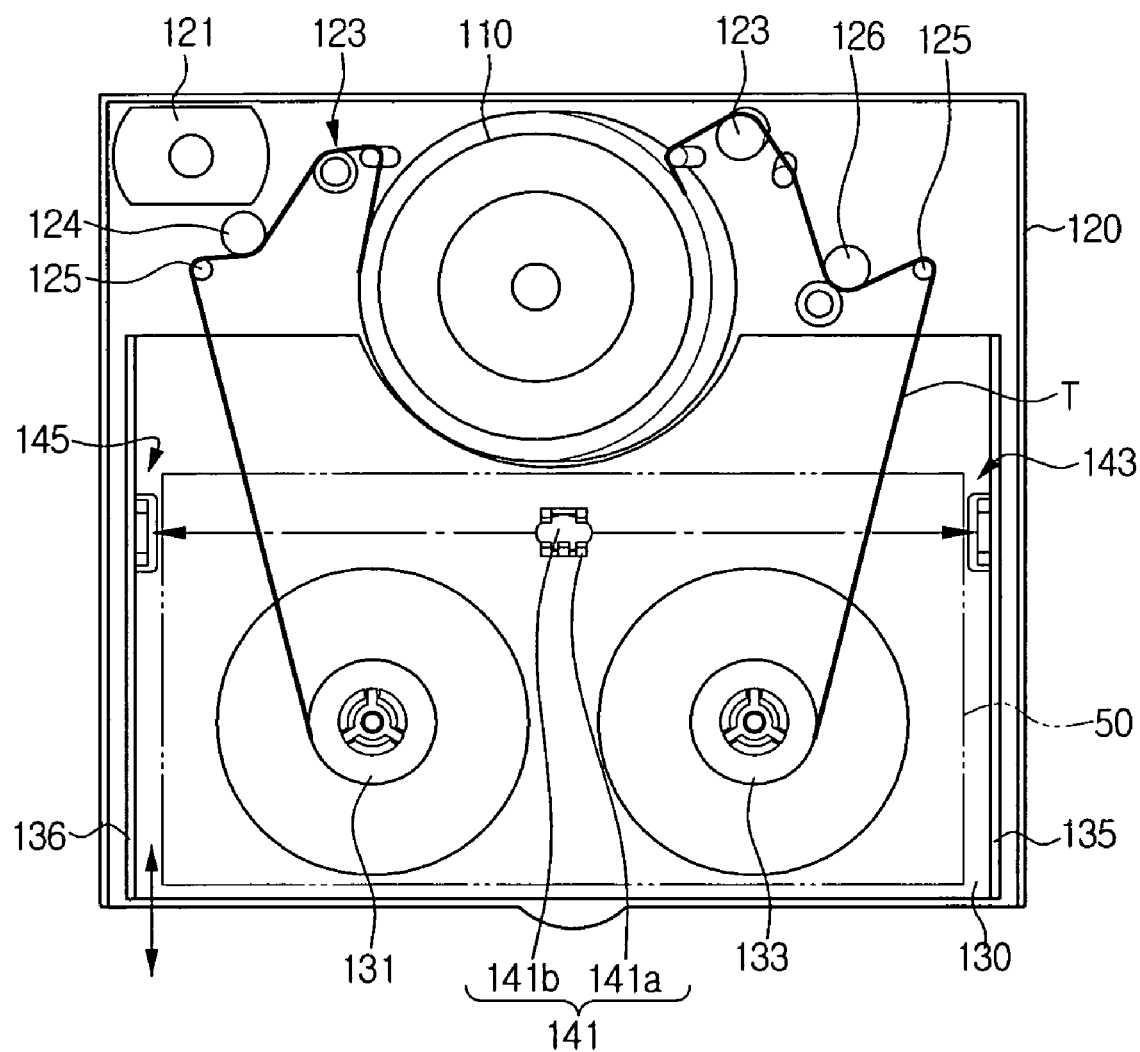
FIG. 6 is a top plan view of a magnetic recording and reproducing apparatus according to another exemplary embodiment of the present invention.
Figure 7:
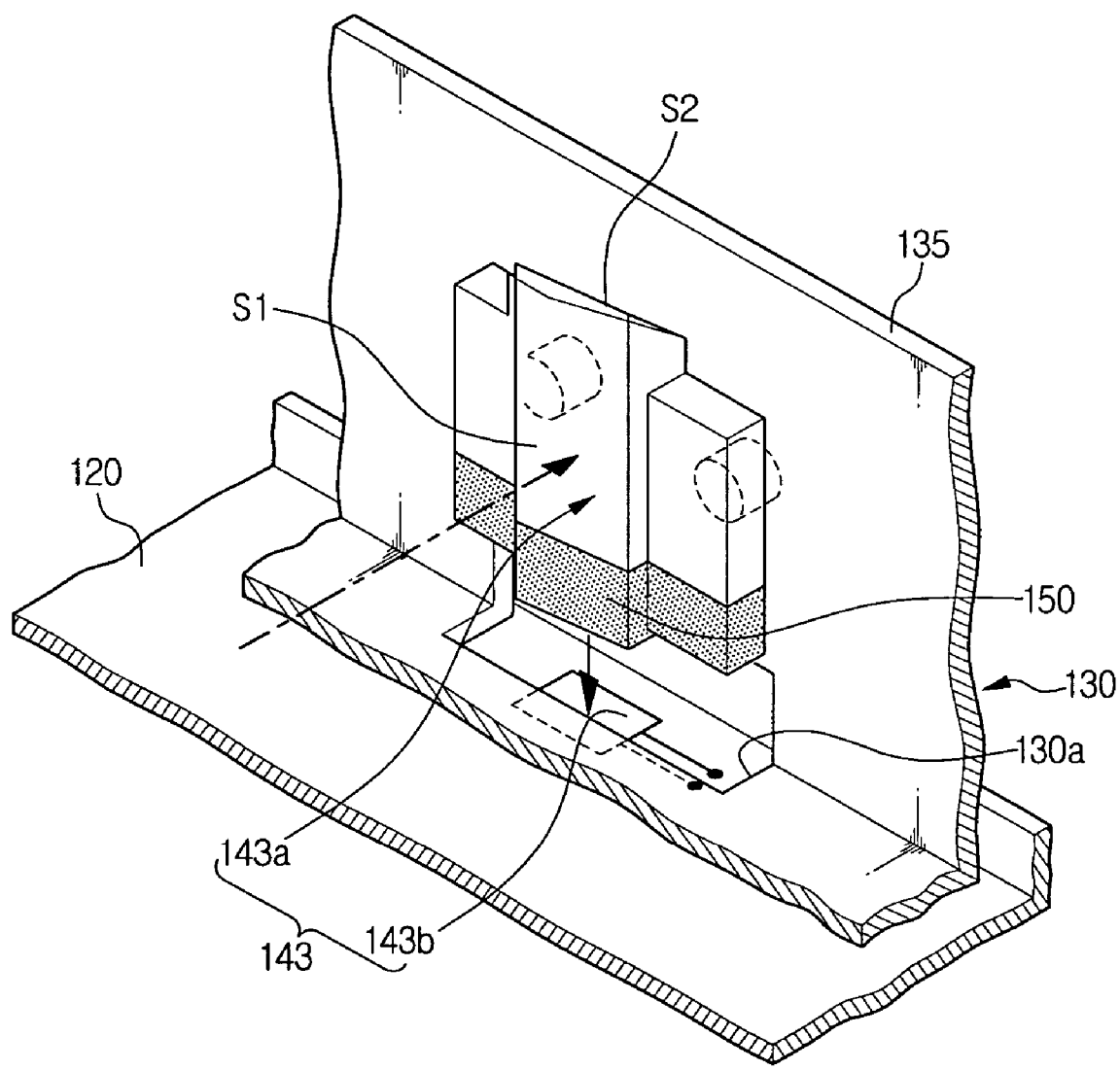
FIGS. 7 and 8 are perspective views of the light receivers of FIG. 6.

Referring to FIGS. 6 and 7, a magnetic recording and reproducing apparatus according to another exemplary embodiment of the present invention includes a main deck 120 having a head drum 110, a sub-deck 130 slidably mounted to the main deck 120, a tape-end sensor and a light interrupter 150.

The sub-deck 130 is mounted on the main deck 120 to reciprocate by power supplied from a loading motor 121. The main deck 120 includes guide members 123, 124 and 125 for guiding running of the tape T.

On the sub-deck 120, a supply reel table 131 adapted to receive a tape reel of a tape cassette 50 and a take-up reel table 133 are rotatably mounted. The reel tables 131 and 133 are selectively supplied with power from a capstan motor 126 mounted to the main deck 120 to rotate the reel tables.

The sub-deck 120 is loaded toward the head drum 110 when mounting the tape cassette 50 and unloaded away from the head drum 110 when withdrawing the tape cassette 50. Because such a loading and unloading operation and a driving mechanism of the sub-deck 120 are generally known, a detailed description thereof is omitted.

The tape-end sensor includes a light emitter 141 protruding from an upper portion of the sub-deck 130, first and second light receivers 143 and 145 symmetrically disposed with respect to the light emitter 141 and adapted to receive light projected from the light emitter 141.

The light emitter 141 includes a holder 141a protruding from the upper portion of the sub-deck 130 and a light emitting diode (LED) 141b supported by the holder 141a. The LED 141b projects light bi-directionally to sidewalls 135 and 136 of the sub-deck 130. The LED 141b projects the light onto the tape being run.

The first light receiver 143 (FIG. 7) senses light projected onto the tape T being wound around the take-up reel table 133 and thereby detects the starting end of the tape T. The second light receiver 145 senses light projected onto the tape T being supplied to supply reel table 131 and thereby detects the finishing end of the tape T.

Figure 8:
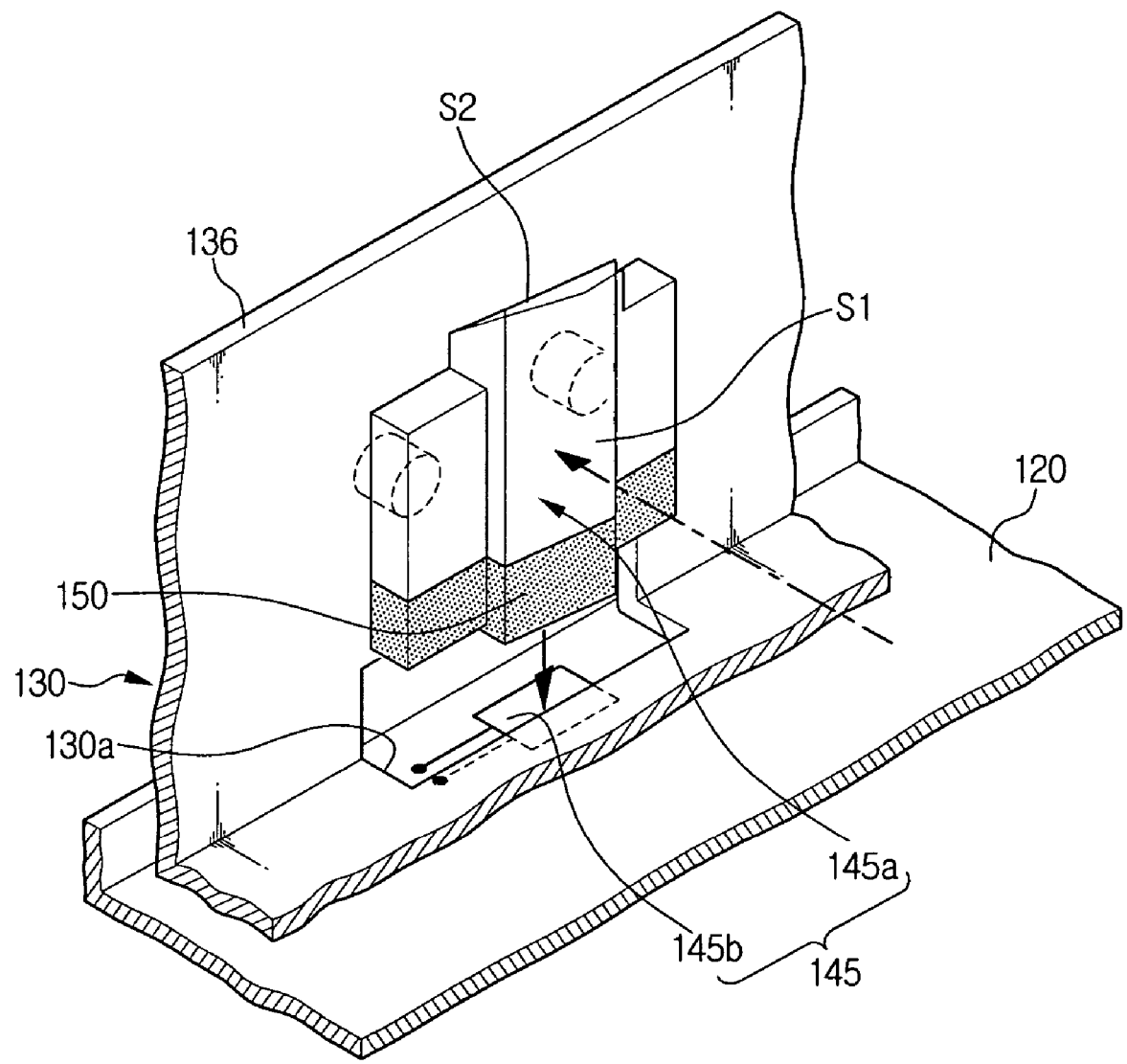

With reference to FIGS. 7 and 8, the first and the second light receivers 143 and 145 include first and second prisms 143a and 145a mounted on the sidewalls 135 and 136 of the sub-deck 130 and first and second light receiving sensors 143b and 145b disposed below the prisms 143a and 145a, respectively.

The prisms 143a and 145a are made of a transparent material to transmit incident light. The respective prisms 143a and 145a include a light incident surface S1 adapted to receive light projected from the light emitter 141 and a reflecting surface S2 adapted to refract incident light toward the light receiving sensors 143b and 145b. Additionally, the prisms 143a and 145a are provided with the light interrupter 150, respectively.

The light interrupter 150 preferably includes a light absorption member disposed below the prisms 143a and 145a to absorb incident light. The light absorption member may be a black film attached to the prisms 143a and 145a. Alternatively, the light absorption member may include a scratched surface formed by scratching the incident surface S1 to form a surface having a predetermined roughness. By providing the light interrupter 150, the light passing by the tape T may be preventing from being transmitted to the light receiving sensors 143b and 145b through the prisms 143a and 145a.

The light receiving sensors 143b and 145b are mounted to the main deck 120 to apply a light receiving signal to the control part in connection with a signal circuit (not shown).

The sub-deck 130 has a light transmission hole 130a for transmitting the light refracted by the prisms 143a and 145a to the light receiving sensors 143b and 145b.

According to the above structure as shown in FIG. 6, the light receiving sensors 143b and 145b may be disposed below the prisms 143a and 145a when the sub-deck 130 is loaded, that is, moved toward the head drum 110. Therefore, the above magnetic recording and reproducing apparatus according to another exemplary embodiment of the present invention may expect the same effects as described in relation to FIGS. 1 through 5.

As may be appreciated from the above description, a tape-end sensor and a magnetic recording and reproducing apparatus according to exemplary embodiments of the present invention blocks light to the light receiver that does not pass through the tape. Therefore, malfunction of the sensors may be prevented, thereby improving reliability of the product.

While the invention has been shown and described with reference to certain embodiments thereof, it will be understood by those skilled in the art that various changes in form and details may be made therein without departing from the spirit and scope of the invention as defined by the appended claims.

What is claimed is:

1. A tape-end sensor for a magnetic recording and reproducing apparatus that senses a starting end and a finishing end of a tape being drawn from a tape cassette disposed proximal a deck, comprising:

a light emitter mounted on the deck adapted to project a light onto the tape being drawn and run from the tape cassette;

a light receiver adapted to receive the light projected from the light emitter and transmitted through the tape; and a light interrupter adapted to block the light projected to the light receiver that does not pass through the running tape.

2. The tape-end sensor of claim 1, wherein the light receiver includes
   first and second prisms respectively connected to opposite sidewalls of the deck and having a height corresponding to that of the light emitter; and
   first and second receiving sensors disposed below the first and second prisms to receive the light refracted by the first and second prisms.

3. The tape-end sensor of claim 2, wherein the optical interrupter includes
   first and second light absorption members attached to cover a predetermined area of the first and second prisms.

4. The tape-end sensor of claim 3, wherein
   the first and second light absorption members include a black film.

5. The tape-end sensor of claim 2, wherein
   the light interrupter has a scratched surface formed by scratching a predetermined area of the first and second prisms to block transmission of light.

6. The tape-end sensor of claim 2, wherein
   each of the first and second prisms has a reflecting surface adapted to reflect to the first and second receiving sensors light projected from the light emitter.

7. The tape-end sensor of claim 2, wherein
   a circuit board connected to the deck supports the first and second receiving sensors so that the first and second receiving sensors are directed toward the first and second prisms.

8. The tape-end sensor of claim 7, wherein the light receiver includes
   a holder supported by the circuit board protrudes from an upper portion of the deck; and
   a light emitter supported by the holder adapted to project the light onto the first and second prisms.

9. A magnetic recording and reproducing apparatus, comprising:
   a deck mounted to which a head drum is connected to record and reproduce information on a running tape; and
   a tape-end sensor adapted to sense starting and finishing ends of the running tape, the tape-end sensor including
      a light emitter mounted on the deck adapted to project light onto the running tape;
      a light receiver adapted to receive light projected from the light emitter and transmitted through the running tape, and
      a light interrupter adapted to block light projected to the light receiver that does not pass through the running tape.

10. The magnetic recording and reproducing apparatus of claim 9, wherein the light receiver includes
    first and second prisms respectively connected to opposite sidewalls of the deck and having a height substantially corresponding to that of the light emitter; and
    first and second receiving sensors disposed below the first and second prisms to receive light refracted by the first and second prisms.

11. The magnetic recording and reproducing apparatus of claim 10, wherein
    the light interrupter has a scratched surface formed by scratching a predetermined area of the first and second prisms to block transmission of light.

12. The magnetic recording and reproducing apparatus of claim 10, wherein
    each of the first and second prisms has a reflecting surface adapted to reflect light projected from the light emitter to the light receiving sensor.

13. The magnetic recording and reproducing apparatus of claim 10, wherein
    a circuit board connected to the deck supports the first and second receiving sensors so that the first and second receiving sensors are directed toward the prism.

14. The magnetic recording and reproducing apparatus of claim 13, wherein the light receiver includes
    a holder supported by the circuit board protrudes from an upper portion of the deck; and
    a light emitter supported by the holder adapted to project light onto the first and second prisms.

15. The magnetic recording and reproducing apparatus of claim 10, wherein the light interrupter includes
    first and second light absorption members attached to cover a predetermined area of the first and second prisms.

16. The magnetic recording and reproducing apparatus of claim 15, wherein
    the first and second absorption members include a black film.

17. A magnetic recording and reproducing apparatus, comprising:
    a main deck to which a head drum is connected;
    a sub-deck slidably mounted to the main deck to slide in a reciprocating motion and adapted to receive a tape cassette; and
    a tape-end sensor adapted to sense the tape being drawn from the tape cassette, the tape-end sensor including
       a light emitter mounted on the sub-deck adapted to project light;
       a light receiver adapted to receive light projected from the light emitter and transmitted through the tape; and
       a light interrupter adapted to block light projected to the light receiver that does not pass through the running tape.

18. The magnetic recording and reproducing apparatus of claim 17, wherein the light receiver includes
    a first light receiver perceiving the light projected in a direction for withdrawing the tape drawn from the cassette tape to detect the starting end of the tape; and
    a second light receiver perceiving the light projected in a direction for drawing out the tape from the tape cassette to detect the finishing end of the tape.

19. The magnetic recording and reproducing apparatus of claim 18, wherein the first and the second light receivers respectively include
    a prism mounted on a sidewall of the sub-deck adapted to refract incident light; and
    a light receiving sensor mounted to a main deck adapted to receive light refracted by the prism.

20. The magnetic recording and reproducing apparatus of claim 19, wherein
    the light interrupter has a light absorption member partly covering the respective prisms to absorb incident light that has not passed through the tape.

21. The magnetic recording and reproducing apparatus of claim 20, wherein
    the light absorption member includes a black film.

22. The magnetic recording and reproducing apparatus of claim 19, wherein
    the light absorption member has a scratched surface of a predetermined roughness formed on a part of a light incident surface of the prism.

* * * * *